United States Patent Office
3,712,933
Patented Jan. 23, 1973

3,712,933
POLYIMIDE COMPOSITIONS
Maurice Docloux, Irigny and Max Gruffaz, La Mulatiere, France, assignors to Rhone-Poulenc S.A., Paris, France
No Drawing. Filed Aug. 24, 1971, Ser. No. 174,551
Claims priority, application France, Aug. 27, 1970, 7031362; June 24, 1971, 23,068
Int. Cl. C08g 41/04
U.S. Cl. 260—857 PI
18 Claims

ABSTRACT OF THE DISCLOSURE

A thermosetting composition having remarkable heat resistance which comprises (a) an imide prepolymer obtained by reacting an N,N'-bis-imide of an unsaturated dicarboxylic acid of general formula:

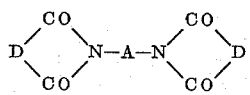

in which D represents a divalent organic radical containing a carbon-carbon double bond and A is a divalent organic radical possessing at least two carbon atoms, with a polyamine of general formula:

$$R(NH_2)_x$$

in which R represents an organic radical of valency $x$ and $x$ is an integer at least equal to 2, 0.55 to 25 mols of bis-imide being used per molar —$NH_2$ group of the polyamine, and (b) an unsaturated polyester.

---

The present invention relates to thermosetting compositions based on prepolymers with imide groups and on unsaturated polyesters.

French Patent No. 1,555,564 discloses thermosetting resins obtained by reacting an N,N'-bis-imide of an unsaturated dicarboxylic acid, of general formula:

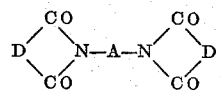 (I)

in which D represents a divalent radical containing a carbon-carbon double bond and A represents a divalent radical possessing at least two carbon atoms, with a di-primary diamine of general formula:

$$H_2—B—NH_2$$

in which B represents a divalent radical which does not possess more than 30 carbon atoms. The amounts of N,N'-bis-imide and of diamine are so chosen that the ratio number of mols of bis-imide
———————————————
number of mols of diamine is at least 1; additionally, it is generally preferred that it should be less than 50. Thermosetting resins are obtained which are remarkably resistant to severe heat exposures. This specification also indicates that the preparation of these resins can be effected in bulk, by heating the previously intimately mixed reagents, or in an inert polar diluent such as dimethylformamide, N-methylpyrrolidone and dimethylacetamide, the latter process being chosen where, for example, the application of the polymer formed requires the use of a solution.

The specification also indicates that for numerous uses it is advantageous to carry out the process in two stages;

in a first stage, a prepolymer is prepared by heating the intimate mixture of the two reagents to a temperature of the order of 100 to 250° C. The prepolymer obtained can be used in the form of a solution, a suspension or a powder or can furthermore be shaped by simple hot casting. In a second stage, the prepolymer is cured by heating to temperatures of the order of 350° C., under pressure if required.

It is also known (Addition No. 74,800 to French Patent No. 1,200,217) to incorporate into unsaturated polyesters fillers such as polyolefine derivatives or polyacrylic derivatives, of polyamides or aminoplasts.

According to the present invention there is provided a thermosetting composition which comprises (a) a prepolymer with imide groups obtained by reaction of an N,N'-bis-imide of an unsaturated dicarboxylic acid, of general formula:

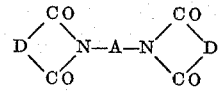 (I)

in which D represents a divalent organic radical containing a carbon-carbon double bond and A represents a divalent organic radical possessing 2 to 30 carbon atoms, and a polyamine of general formula:

$$R(NH_2)_x \quad (II)$$

in which R represents an organic radical of valency $x$ and $x$ is an integer at least equal to 2, from 0.55 to 25 mols of bis-imide being used per molar $NH_2$ group of the polyamino, and (b) an unsaturated polyester.

The symbol D is derived from an anhydride of a dicarboxylic ethylenic acid, of general formula:

 (III)

such as maleic anhydride, citraconic anhydride, itaconic anhydride, pyrocinchonic anhydride or dichloromaleic anhydride, as well as the Diels-Alder reaction products of one of these anhydrides with an acyclic, alicyclic or heterocyclic diene. As regards the anhydrides obtained from dienes, reference may be made to for example, volume IV of "Organic Reactions" (John Wiley and Sons, Inc.); tetrahydrophthalic anhydride and endomethylene-tetrahydrophthalic anhydride may be mentioned in particular.

The symbol A can represent a linear or branched alkylene radical with less than 13 carbon atoms, a phenylene or cyclohexylene radical, or a radical of formula:

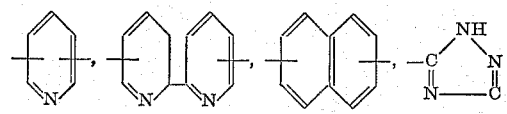

and

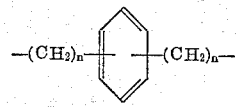

wherein $n$ represents an integer from 1 to 3. The symbol A can also comprise several phenylene or cyclohexylene radicals bonded to one another by a simple valency bond or by an inert atom or group, such as —O—, —S—, an alkylene group with 1 to 3 carbon atoms, —CO—, —$SO_2$—, —$NR_1$—, —N=N—, —CONH—, —COO—, —P(O)$R_1$—, —CONH—X—NHCO—,

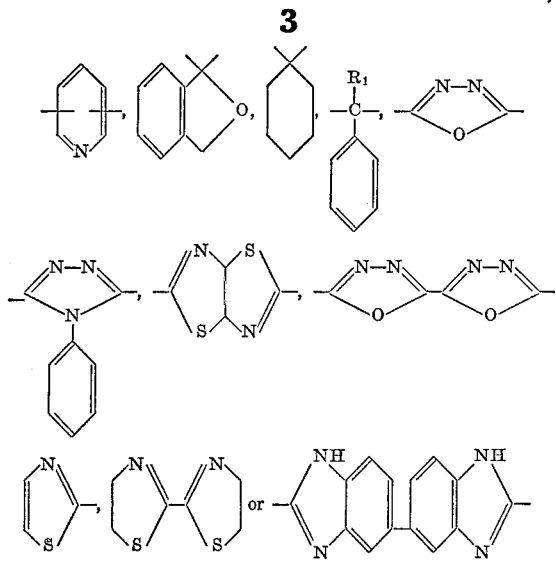

wherein $R_1$ represents a hydrogen atom, an alkyl radical with 1 to 4 carbon atoms, or a phenyl or cyclohexyl radical, and X represents an alkylene radical with less than 13 carbon atoms. The various phenylene or cyclohexylene radicals can be substituted by methyl groups, for example.

Specific examples of bis-imides which may be used include:

N,N'-ethylene-bis-maleimide,
N,N'-hexamethylene-bis-maleimide,
N,N'-meta-phenylene-bis-maleimide,
N,N'-para-phenylene-bis-maleimide,
N,N'-4,4'-diphenylmethane-bis-maleimide,
N,N'-4,4'-diphenyl ether-bis-maleimide,
N,N'-4,4'-diphenylsulphone-bis-maleimide,
N,N'-4,4'-dicyclohexylmethane-bis-maleimide,
N,N'-pyridine-diyl-2,6-bis-maleimide,
N,N'-4,4'-diphenyl-3,5-pyridine-bis-maleimide,
N,N'-α,α'-4,4'-dimethylene-cyclohexane-bis-maleimide,
N,N'-meta-xylylene-bis-maleimide,
N,N'-para-xylylene-bis-maleimide,
N,N'-4,4'-diphenylcyclohexane-bis-maleimide,
N,N'-meta-phenylene-bis-tetrahydrophthalimide,
N,N'-4,4'-diphenylmethane-bis-citraconimide,
N,N'-4,4'-diphenyl-1,1-propane-bis-maleimide,
N,N'-4,4'-triphenyl-1,1,1-ethane-bis-maleimide,
N,N'-4,4'-triphenylmethane-bis-maleimide and
N,N'-3,5-triazole-1,2,4-bis-maleimide.

Such bis-imides can be prepared following the methods described in U.S. Pat. No. 3,018,290 and British Pat. No. 1,137,592.

The polyamine (II) is suitably a di-primary diamine of general formula:

$$H_2N-E-NH_2 \quad (IV)$$

in which E is as defined for A.

Suitable diamines which can be used in the preparation of the prepolymer (a) include:
4,4'-diaminodicyclohexylmethane,
1,4-diamino-cyclohexane,
2,6-diaminopyridine,
meta-phenylenediamine,
para-phenylene-diamine,
4,4'-diamino-diphenylmethane,
2,2-bis-(4-aminophenyl)-propane,
benzidine,
4,4'-diaminophenyl ether,
4,4'-diaminophenyl sulphide,
4,4'-diamino-diphenylsulphone,
bis(4-aminophenyl)methylphosphine oxide,
bis(4-aminophenyl)phenylphosphine oxide,
bis(4-aminophenyl)methylamine,
1,5-diamino-naphthalene,
meta-xylylenediamine,
para-xylylenediamine,
1,1-bis(para-aminophenyl)-phthalane,
hexamethylenediamine,
6,6'-diamino-2,2'-dipyridyl,
4,4'-diamino-benzophenone,
4,4'-diaminoazobenzene,
bis(4-aminophenyl)phenylmethane,
1,1-bis(4-aminophenyl)cyclohexane,
1,1-bis(4-amino-3-methyl-phenyl)cyclohexane,
2,5-bis(m-aminophenyl)-1,3,4-oxadiazole,
2,5-bis(p-aminophenyl)-1,3,4-oxadioazole,
2,5-bis(m-aminophenyl)-thiazolo-(4,5-d)thiazole,
5,5'-di(m-aminophenyl)-(2,2')-bis-(1,3,4-oxadiazolyl),
4,4'-bis(p-aminophenyl)-2,2'-dithiazole,
m-bis (4-p-aminophenyl)-thiazolyl-2 benzene,
2,2'-bis(m-aminophenyl)-5,5'-dibenzimidazole,
4,4'-diaminobenzanilide,
phenyl 4,4'-diaminobenzoate,
N,N'-bis(4-aminobenzoyl)-p-phenylenediamine,
3,5-bis(m-aminophenyl)-4-phenyl-1,2,4-triazole,
N,N'-bis(p-aminobenzoyl)-4,4'-diamino-diphenyl-methane,
bis-p-(4-amino-phenoxycarbonyl)-benzene,
bis-p-(4-amino-phenoxy)benzene,
3,5-diamino-1,2,4-triazole,
1,1-bis(4-aminophenyl)-1-phenyl-ethane and
3,5-bis(4-aminophenyl)pyridine.

The polyamines (II) which are not di-primary diamines, are preferably those which have less than 50 carbon atoms and possess 3 to 5 —$NH_2$ groups per molecule. The —$NH_2$ groups can be attached to a benzene nucleus optionally substituted by methyl groups, or by a naphthalene, pyridine or triazine nucleus; they can also be attached to several benzene nuclei bonded to one another by a simple valency bond or by an inert atom or group which can be one of those described above in connection with the definition of A, or can be

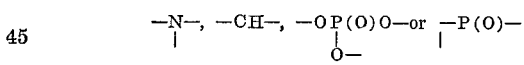

Suitable such polyamines include:

1,2,4-triamino-benzene,
1,3,5-triamino-benzene,
2,4,6-triamino-toluene,
2,4,6-triamino-1,3,5-trimethyl-benzene,
1,3,7-triamino-naphthalene,
2,4,4'-triamino-diphenyl,
2,4,6-triamino-pyridine,
2,4,4'-triamino-phenyl ether,
2,4,4'-triamino-diphenylmethane,
2,4,4'-triamino-diphenylsulphone,
2,4,4'-triamino-benzophenone,
2,4,4'-triamino-3-methyl-diphenylmethane,
N,N,N-tri(4-aminophenyl)amine,
tri(4-aminophenyl)methane,
4,4',4''-triaminophenyl orthophosphate,
tri(4-aminophenyl)phosphine oxide,
3,5,4'-triamino-benzanilide,
melamine,
3,5,3',5'-tetraamino-benzophenone,
1,2,4,5-tetraamino-benzene,
2,3,6,7-tetraamino-naphthalene,
3,3'-diamino-benzidine,
3,3',4,4'-tetraaminophenyl ether,
3,3',4,4'-tetraamino-diphenylmethane,
3,3',4,4'-tetraamino-diphenylsulphone,
3,5-bis(3,4'-diaminophenyl)pyridine and the oligomers of average formula:

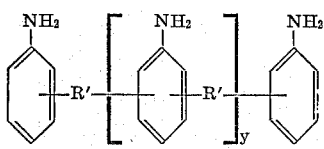

wherein y represents a number ranging from about 0.1 to 2, and R' denotes a divalent hydrocarbon radical having 1 to 8 carbon atoms and derived from an aldehyde or ketone of general formula:

in which the oxygen atom is bonded to a carbon atom of the radical R'. Typical aldehydes and ketones from which R' may be derived include formaldehyde, acetaldehyde, oenanthaldehyde, benzaldehyde, acetone, methyl ethyl ketone, 2-hexanone, cyclohexanone and acetophenone. The amino group-containing oligomers can be obtained in known manner, for example as described in French Pats. Nos. 1,430,977, 1,481,935 and 1,533,696; the crude mixtures of polyamides obtained according to these processes can be enriched in one or more constituents, for example by distillation under reduced pressure.

The prepolymer (a) can be prepared by heating the bis-imide and the polyamine, which have optionally been intimately mixed beforehand, at between 50° C. and 250° C. The process can be carried out in bulk or in a polar solvent such as cresol, dimethylformamide, N-methylpyrrolidone, dimethylacetamide or chlorobenzene. The prepolymers which are preferably employed are those of melting point between 50° C. and 150° C. To obtain these, it generally suffices to heat the bis-imide and the polyamine at between 50° C. and 180° C. for from several minutes to several hours; the shorter the time the higher is the temperature employed. Preferably 0.6 to 2.5 mols of bis-imide are used per molar —NH₂ group of the polyamine.

The unsaturated polyesters which are used in the compositions of this invention are well-known products. They are usually prepared by polycondensation of polycarboxylic derivatives with polyols; by "polycarboxylic derivatives" are meant acids, lower alcohol esters, acid chlorides and, where appropriate, anhydrides. Of the monomers which are polycondensed, at least one possesses olefinic unsaturation. In the compositions according to the invention, it is generally envisaged that the unsaturated starting materials are diacids or dianhydrides having an olefinic double bond in the α,β-position, in particular derivatives of maleic, chloromaleic, itaconic, citraconic, aconitic, pyrocinchonic, fumaric, chlorendic, endomethylenetetrahydrophthalic, tetrahydrophthalic, ethylmaleic, succinic, sebacic, phthalic, isophthalic, adipic, and hexahydrophthalic acids. Suitable polyols include ethylene glycol, propylene glycol, diethylene glycol, triethylene glycol, neopentyl glycol, tetraethylene glycol, butylene glycol, dipropylene glycol, glycerol, trimethylol-propane, pentaerythritol, sorbitol, and 3,3-bis(hydroxymethyl)cyclohexene.

The term "unsaturated polyester" is intended to cover solutions of the polycondensates described above in a liquid monomer capable of copolymerising with them. These monomers are well known in polyester technology; examples include styrene, α-methylstyrene, vinyltoluene, p-(α-methylvinyl)benzophenone, divinylbenzene, vinyl 2-chloroethyl ether, N-vinylpyrrolidone, 2-vinyl-pyridine, indene, methyl acrylate, methyl methacrylate, acrylamide, N-t-butylacrylamide, acrylonitrile, hexahydro-1,3,5-triacrylo-s-triazine, allyl phthalate, allyl fumarate, allyl cyanurate, allyl phosphate, diethylene glycol diallyl carbonate, alyl lactate, allyl malonate, allyl tricarballylate (propane-1,2,3-tricarboxylate, allyl trimesate and allyl trimellate. Where a polymerisable monomer is used, it generally represents from 10% to 60% by weight of the weight of the unsaturated polyester solution.

The unsaturated polyesters may be prepared by known methods: on this subject, reference may be made to for example Kirk-Othmer, Encyclopedia of Chemical Technology, 2nd edition, volume 20 under the heading "Unsaturated Polyesters."

In the compositions of the invention, the imide prepolymers generally represent more than 30%, and preferably 35% to 95%, by weight of the total weight of the combination of prepolymer and polyester.

The compositions may be prepared by intimately mixing the prepolymer with imide groups and the polyester. Depending on the physical properties of the ingredients, this may be achieved by applying the usual techniques for mixing finely divided solids, or by preparing a solution or suspension of one of the constituents of the mixture in the other, which is maintained in the liquid state, optionally in a solvent such as one of those mentioned above for the preparation of the imide prepolymer.

Thereafter the mixture may be heated for, for example, several minutes at a temperature of 50° C. to 180° C., which temperature is generally sufficient to produce a homogeneous liquid if the starting mixture contains a solid phase.

According to one embodiment, the imide prepolymer is prepared in the presence of the polyester by heating a mixture of the polyester with the bis-imide (I) and the polyamine (II) at a temperature from 50° C. to 180° C.

Apart from the imide prepolymer and the unsaturated polyester, the compositions of this invention can also contain, by way of an adjuvant, an aromatic compound (c) possessing 2 to 4 benzene rings, which at atmospheric pressure, does not sublime or boil at or below 250° C.; the addition of these aromatic compounds makes it possible to extend the period over which the composition can be used in the molten state. In these aromatic compounds (c), the benzene rings can form condensed nuclei or can be bonded to one another by a valency bond or by an inert atom or group such as

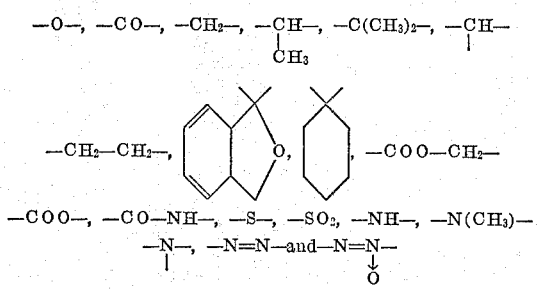

it being understood that in any one compound one or more of these linkages may be present. The benzene rings can be substituted by inert radicals such as —CH₃, —OCH₃, —F, —Cl and —NO₂. Typical compounds (c), which may be used, include the isomeric terphenyls, the chlorinated diphenyls, phenyl ether, 2,2'-naphthyl ether, o-methoxyphenyl ether, benzophenone, 2,5,4'-trimethylbenzophenone, p-phenylbenzophenone, p-fluorobenzophenone, diphenylamine, diphenylmethylamine, triphenylamine, azobenzene, 4,4'-dimethylazobenzene, azoxybenzene, diphenylmethane, 1,1-diphenyl-ethane, 1,1-diphenylpropane, triphenylmethane, diphenylsulphone, phenyl sulphide, 1,2-diphenyl-ethane, p-diphenoxybenzene, 1,1-diphenylphthalane, 1,1-diphenyl-cyclohexane, phenyl benzoate, benzyl benzoate, p-nitrophenyl terephthalate and benzanilide. The compositions preferably contain up to 10% by weight of aromatic compound (c); the compound can be introduced at any point during the preparation of the compositions.

In the form of a homogeneous liquid, the compositions of this invention can be used directly, for example for the impregnation of conductors or moulding by simple casting, preferably hot. It is also possible, after curing them by heating, to employ the compositions in the form of powders, for example to produce compression-moulded articles, optionally in combination with fibrous or pulverulent fillers. The compositions can also be used in solution for the preparation of coatings, adhesives and laminated materials, the base material of which can be made of inorganic fibres, vegetable fibres or synthetic fibres.

The compositions according to the invention can be cured by heating, generally to temperatures of 100° C. to 280° C.

The following examples further illustrate the present invention.

EXAMPLE 1

(a) 40.95 g. of N,N'-4,4'-diphenylmethane-bis-maleimide, 9.12 g. of 4,4'-diamino-diphenylmethane and 5.5 g. of a solution of an unsaturated polyester in allyl phthalate were intimately mixed. The mixture was heated for 15 minutes in a heated chamber at 150° C.

(b) The liquid composition thus obtained was cast into a vertical parallelepiped mould (125 x 75 x 6 mm.), the inner wall of which had a silicone resin lining, the mould being heated to 200° C. beforehand. The assembly was left for 3 hours in a heated chamber at 200° C. and the product then removed from the mould at 150° C. The moulding was subjected to a supplementary heat treatment for 12 hours at 200° C. It then had a flexural breaking strength of 11.2 kg./mm.$^2$ at 25° C.; after exposure for 300 hours at 300° C. in a ventilated chamber, this strength was 11.6 kg./mm.$^2$ (span: 25.4 mm.).

The unsaturated polyester used was prepared by heating 40.1 kg. of maleic acid and 28.2 kg. of propylene glycol at 190° C. under nitrogen for 10 hours and then dissolving the product in 44 kg. of allyl phthalate containing 6 g. of hydroquinone.

EXAMPLE 2

The experiment described in Example 1 was repeated, using 5.5 g. of a solution of an unsaturated polyester in allyl phthalate, prepared by heating 874 g. of maleic acid, 149.5 g. of dicyclopentadiene, 354 g. of ethylene glycol and 186 g. of propylene glycol under nitrogen at 200° C. for 5 hours and then dissolving the product in 863 g. of allyl phthalate containing 0.19 g. of hydroquinone.

The mixture was kept for 20 minutes in a heated chamber at 150° C. A homogeneous liquid composition was obtained, from which a moulding was produced by casting under the conditions described in Example 1. The supplementary heat treatment was carried out at 200° C. for 24 hours. The article obtained had a flexural breaking strength of 16.1 kg./mm.$^2$ at 25° C.; it showed no surface deformation whatsoever after exposure for 3,800 hours at 250° C.

EXAMPLE 3

The experiment described in Example 1 was repeated, subjecting the moulding to a supplementary heat treatment at 200° C. for 24 hours and then at 250° C. for the same period. It then had a flexural breaking strength of 12.4 kg./mm.$^2$ at 25° C.; at 250° C. This strength was 10.1 kg./mm.$^2$. After exposure for 100 hours at 300° C., the strength at 250° C. was 9.5 kg./mm.$^2$.

EXAMPLE 4

A moulding is prepared as described in Example 1, using 5.5 g. of the unsaturated polyester solution employed in Example 2. The supplementary heat treatment was carried out under the conditions described in Example 3. The article thus obtained had a flexural breaking strength of 12.8 kg./mm.$^2$ at 25° C. This strength remained unchanged after exposure for 100 hours at 300° C.

EXAMPLE 5

10 g. of the polyester solution used in Example 1 were added, at 25° C., to 110 g. of N-methylpyrrolidone. 90 g. of a prepolymer prepared by heating 89.5 g. of N,N'-4,4'-diphenylmethane-bis-maleimide and 19.8 g. of 4,4'-diamino-diphenylmethane for 25 minutes in a chamber at 150° C., were dissolved in the mixture obtained; this prepolymer softened at 95° C.

A satin type of glass fibre fabric, of specific weight 308 g./m.$^2$, was coated with a part of this solution; this fabric had beforehand been thermally desized and then pretreated with gamma-aminopropyltriethoxysilane. After coating, the fabric was dried for 2 hour at 130° C. under ventilated conditions.

After cooling, 15 rectangular samples were cut from this fabric and stacked so as to form a laminated assembly. This assembly was then heated between the platens of a press preheated to 110° C. The temperature was raised to 250° C. over one hour, initially under slight pressure (so-called contact pressure), until 165° C. was reached, and then under 35 bars pressure.

The assembly was allowed to cool under pressure to 100° C. and the laminate then released; finally, it was subjected to a supplementary heat treatment for 48 hours at 250° C. It then had a flexural breaking strength of 53.7 kg./mm.$^2$ at 25° C. (span: 50 mm.). Its resin content was 32.3% by weight. After exposure for 150 hours at 300° C., this strength was still 35 kg./mm.$^2$.

EXAMPLE 6

The experiment described in Example 5 was repeated, using 36 g. of the same soultion of polyester resin and 130 g. of N-methylpyrrolidone. Furthermore, the coated fabric was dried at 130° C. for 2 hours and the platens of the press were preheated to 210° C. Curing was effected in 20 minutes at 250° C. under 35 bars. The laminate was released at 200° C. It had a flexural breaking strength of 53.7 kg./mm.$^2$ at 25° C. Its resin content was 41% by weight.

EXAMPLE 7

A mixture consisting of 24 g. of the prepolymer described in Example 5 and 16 g. of the unsaturated polyester solution used in that example were heated to 125° C. whilst stirring. After 5 minutes, a viscous homogenous liquid was obtained, which was spread hot between the samples of glass fibre as described in Example 5. The laminate was heated between the platens of a press preheated to 105° C., and the temperature was then raised to 255° C. over 70 minutes; contact pressure was applied up to 145° C., and then a pressure of 35 bars was applied.

After a heat treatment for 48 hours at 250° C. the laminate had a flexural breaking strength of 60.4 kg./mm.$^2$. After exposure for 150 hours at 300° C., this strength was still 35.5 kg./mm.$^2$. Its resin content was 21.5% by weight.

EXAMPLE 8

A laminate was prepared as in Example 5, using 10 g. of an unsaturated polyester prepared by heating 46 kg. of chlorendic acid, 13.7 kg. of maleic acid and 14.85 kg. of ethylene glycol under nitrogen at 175° C. for 12 hours.

The laminate had a flexural breaking strength of 63.2 kg./mm.$^2$ at 25° C. Its resin content was 23% by weight.

EXAMPLE 9

The experiment described in Example 8 was repeated, using 130 g. of N-methylpyrrolidone and 36 g. of the unsaturated polyester. The platens of the press were preheated to 125° C. and the temperature raised to 250° C. over 50 minutes; contact pressure was applied up to 155° C. and a pressure of 35 bars thereafter. The laminate was released at 135° C. and then subjected to a supplementary heat treatment at 250° C. for 15 hours. It then had a flexural breaking strength of 66.5 g./mm.$^2$. Its resin content was 19% by weight.

We claim:

1. A thermosetting composition which comprises, in association, (a) an imide prepolymer obtained by reacting an N,N'-bis-imide of an unsaturated dicarboxylic acid of general formula:

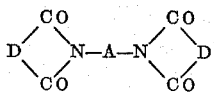

in which D represents a divalent organic radical containing a carbon-carbon double bond and A is a divalent organic radical possessing at least two carbon atoms, with a polyamine of general formula:

in which R represents an organic radical of valency $x$ and $x$ is an integer at least equal to 2, about 0.55 to 25 mols of bis-imide being used per molar —$NH_2$ group of the polyamine, and (b) an unsaturated polyester, said imide prepolymer being present in an amount from about 35% to 95% by weight of the total weight of the prepolymer and unsaturated polyester.

2. A composition according to claim 1 in which about 0.6 to 2.5 moles of bis-imide are present per molar —$NH_2$ group of the polyamine.

3. A composition according to claim 1 in which the polyamine is a di-primary diamine of general formula:

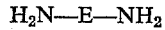

in which E represents a divalent organic radical possessing 2 to 30 carbon atoms.

4. A composition according to claim 1 in which the polyamine is an oligomer of average formula

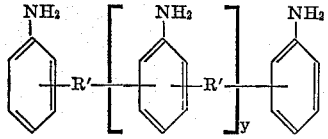

in which $y$ represents a number from about 1.1 to 2 and R' denotes a divalent hydrocarbon radical having 1 to 8 carbon atoms, derived from an aldehyde or ketone of formula:

in which the oxygen atom is bonded to a carbon atom of the radical R'.

5. A composition according to claim 1 in which the polyester is derived from a dicarboxylic acid derivative and a polyol.

6. A composition according to claim 5 in which the dicarboxylic acid derivative is a derivative of maleic, chloromaleic itaconic, citraconic, aconitic, pyrocinchonic, fumaric, chlorendic, endoethylene, tetrahydrophthalic, ethylmaleic, succinic, sebacic, phthalic, isophthalic, adipic or hexahydrophthalic acid.

7. A composition according to claim 6 in which the dicarboxylic acid derivative is a derivative of maleic or chlorendic acid.

8. A composition according to claim 5 in which the polyol is ethylene glycol, propylene glycol, diethylene glycol, triethylene glycol, neopentyl gycol, tetraethylene glycol, butylene glycol, dipropylene glycol, glycerol, trimethylol-propane, pentaerythritol, sorbitol or 3,3-bis(hydroxymethyl)cyclohexene.

9. A composition according to claim 8 in which the polyol is ethylene glycol or propylene glycol.

10. A composition according to claim 1 in which the bisimide is N,N'-4,4'-diphenylmethane bis maleimide.

11. A composition according to claim 1 in which the polyamine is 4,4'-diamino diphenylmethane.

12. A composition according to claim 1 which also contains a liquid monomer capable of copolymerising with the polyester.

13. A composition according to claim 12 in which the liquid monomer is allyl phthalate.

14. A composition accordinng to claim 1 which also contain up to 10% by weight of an aromatic compound (c) possessing 2 to 4 benzene rings which, at atmospheric pressure does not subline or boil at or below 250° C.

15. Process for preparing a composition as claimed in claim 1 which comprises blending the pure polymer and the unsaturated polyester.

16. Process according to claim 15 in which the mixture of the prepolymer and of the unsaturated polyester is heated at between about 50° C. and 180° C.

17. Process according to claim 15 in which the prepolymer is prepared in the presence of the unsaturated polyester.

18. A cured resin obtained by heating a composition as claimed in claim 1 at a temperature of about 100° C. to 280° C.

References Cited

UNITED STATES PATENTS

| | | | |
|---|---|---|---|
| 2,818,405 | 12/1957 | Kovacic | 260—78 |
| 3,562,223 | 2/1971 | Bargain | 260—78 |
| 3,658,764 | 4/1972 | Bargain | 260—78 |
| 3,679,639 | 7/1972 | Bargain | 260—78 |

PAUL LIEBERMAN, Primary Examiner

U.S. Cl. X.R.

117—126 GR; 161—190, 193, 194, 197; 260—32.4 R, 32.6 N, 78 UA, 78 TF, 850, 861, 870